(12) United States Patent
White

(10) Patent No.: US 9,849,975 B2
(45) Date of Patent: Dec. 26, 2017

(54) DEFLECTION CONE IN A REACTION DRIVE HELICOPTER

(71) Applicant: David J. White, La Mesa, CA (US)

(72) Inventor: David J. White, La Mesa, CA (US)

(73) Assignee: RJ HELICOPTER CORPORATION, Scottsdale, AZ (US)

( * ) Notice: Subject to any disclaimer, the term of this patent is extended or adjusted under 35 U.S.C. 154(b) by 386 days.

(21) Appl. No.: 14/723,175

(22) Filed: May 27, 2015

(65) Prior Publication Data

US 2016/0272311 A1    Sep. 22, 2016

Related U.S. Application Data

(60) Provisional application No. 62/015,263, filed on Jun. 20, 2014.

(51) Int. Cl.
  *B64C 27/18* (2006.01)
  *B64C 27/473* (2006.01)
  *B64C 27/82* (2006.01)

(52) U.S. Cl.
  CPC ............ *B64C 27/18* (2013.01); *B64C 27/473* (2013.01); *B64C 2027/8245* (2013.01)

(58) Field of Classification Search
  CPC ................... B64C 27/18; B64C 2027/8245
  See application file for complete search history.

(56) References Cited

U.S. PATENT DOCUMENTS

| 2,924,936 A * | 2/1960 | Gehrke | B64C 27/18 416/20 R |
| 9,120,564 B1 * | 9/2015 | White | B64C 27/473 |

* cited by examiner

*Primary Examiner* — Christopher P Ellis
*Assistant Examiner* — Jessica Wong
(74) *Attorney, Agent, or Firm* — Parsons & Goltry; Robert A. Parsons; Michael W. Goltry

(57) ABSTRACT

A rotor hub for a reaction drive type helicopter includes a cylindrical sidewall having a top and an open bottom which defines an interior volume. A top plate closes the top of the cylindrical sidewall, and at least two pipe sections extend outwardly from the cylindrical sidewall. Each pipe section extends through the sidewall in communication with the interior volume. A horizontal vane is carried in an inlet of the pipe section and extends horizontally across the inlet. A three dimensional body extends downwardly from a central axis of the top plate into the interior volume.

18 Claims, 6 Drawing Sheets

DEFLECTION CONE IN A REACTION DRIVE HELICOPTER

CROSS-REFERENCE TO RELATED APPLICATION

This application claims the benefit of U.S. Provisional Application No. 62/015,263, filed 20 Jun. 2014.

FIELD OF THE INVENTION

This invention relates to reaction drive helicopters.

More particularly, the present invention relates to the reduction of pressure loss in reaction drive helicopters.

BACKGROUND OF THE INVENTION

Reaction-drives, also known as pressure-jet and tip-jet systems have been used successfully in the past to provide rotor power for helicopters. Reaction drive helicopters differ from conventional helicopters in that the rotor power is provided by the thrust of jets mounted at the blade-tips. This eliminates the mechanical transmission systems of conventional helicopters leading to a much lighter aircraft, requiring less energy to move. Reaction drive helicopters have a number of variants which, for the purposes of this invention, are considered to be divided into a first type in which air or gasses are directed through the blades and out a nozzle at the blade tip, and a second type in which a motor is positioned at the blade tip. The first type is typically differentiated on the basis of the air or gas temperature exiting through the jet nozzle at the tips of the helicopter blades. Usually these are labeled hot, warm or cold cycle tip-jet systems and are generated remotely from the blade tip. It is recognized that reaction drive helicopters are part of a larger group of related propulsion units that are generally termed reactive jet drive rotor systems. This larger group encompasses other helicopter rotor tip driven systems including the second type, in which motors such as turbojets, rockets, ramjets, pulse jets and other combustion engines attached to the blade tips have been used to provide rotor power for lifting and forward flight purposes.

While the various systems can be effective, none are used extensively because the energy saved by the reduced weight, is more than offset by inefficiencies in the generation of thrust at the blade tip in the instances of the second type, and losses to air/gasses velocities and pressures during transmission of the air/gasses to the nozzle at the blade tip in the first type. For purposes of this invention, only the first type will be of interest in this description. The pressure loss along the air/gas flow path from the load compressor or engine bleed point to the blade tips is extremely important to reaction drive helicopters. Pressure losses directly contribute to reductions in the system efficiency. It is essential that the pressure losses are reduced to minimal levels. Most of the significant pressure losses occur when the air/gas flows change direction. Another reason care has to be taken to minimize pressure loses, is because reaction drive helicopters use a pneumatic transmission that is less efficient than the conventional mechanical system.

One of the primary areas of concern is the transition of the gases from a vertical direction, moving vertically up the rotor mast, to a generally horizontal direction along the rotor blades. The transition occurs in the rotor hub, and can result in a large pressure drop when the flows turn and divide at a multiple branched "Tee Junction in the rotor hub."

It would be highly advantageous, therefore, to remedy the foregoing and other deficiencies inherent in the prior art.

It is an object of the present invention to reduce the energy losses incurred by the air/gasses transmitted into the blades of the rotor.

SUMMARY OF THE INVENTION

Briefly, to achieve the desired objects and advantages of the instant invention, provided is a rotor hub for a reaction drive type helicopter. The rotor hub includes a cylindrical sidewall having a top and an open bottom, and defines an interior volume. A top plate closes the top of the cylindrical sidewall, and at least two pipe sections extend outwardly from the cylindrical sidewall. Each pipe section extends through the sidewall and has an inlet in communication with the interior volume. A three dimensional body extends downwardly from a central axis of the top plate into the interior volume.

In specific aspects of the invention, the three dimensional body has a shape based on "Witch of Agnesi" curves and a horizontal vane is carried in the inlet of each of the pipe sections and extending horizontally across the inlet. A pair of horizontal vanes carried in the inlet of each of the at least two pipe sections and extending horizontally across the inlet in a parallel spaced apart orientation can also be provided.

In a further aspect, provided is a reaction drive type helicopter. The reation drive helicopter includes a body, an engine carried by the body for producing a stream of compressed air and/or gas and a hollow rotor mast carried by the body for receiving the stream of air and/or gas. The mast terminates in a rotor hub including a cylindrical sidewall having a top and an open bottom rotatably coupled to the hollow rotor mast. The cylindrical sidewall defines an interior volume and a top plate closes the top of the cylindrical sidewall. At least two pipe sections extend outwardly from the cylindrical sidewall. Each pipe section extends through the sidewall and has an inlet in communication with the interior volume. A three dimensional body extends downwardly from a central axis of the top plate into the interior volume. Blades are coupled to the rotor hub, each having a proximal end coupled to one of the at least two pipe sections, a distal end, and a passage extending from the proximal end to the distal end terminating in a blade tip. The passage is in fluid communication with the hub through the pipe section for ducting air/gasses from the mast to the blade tip.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
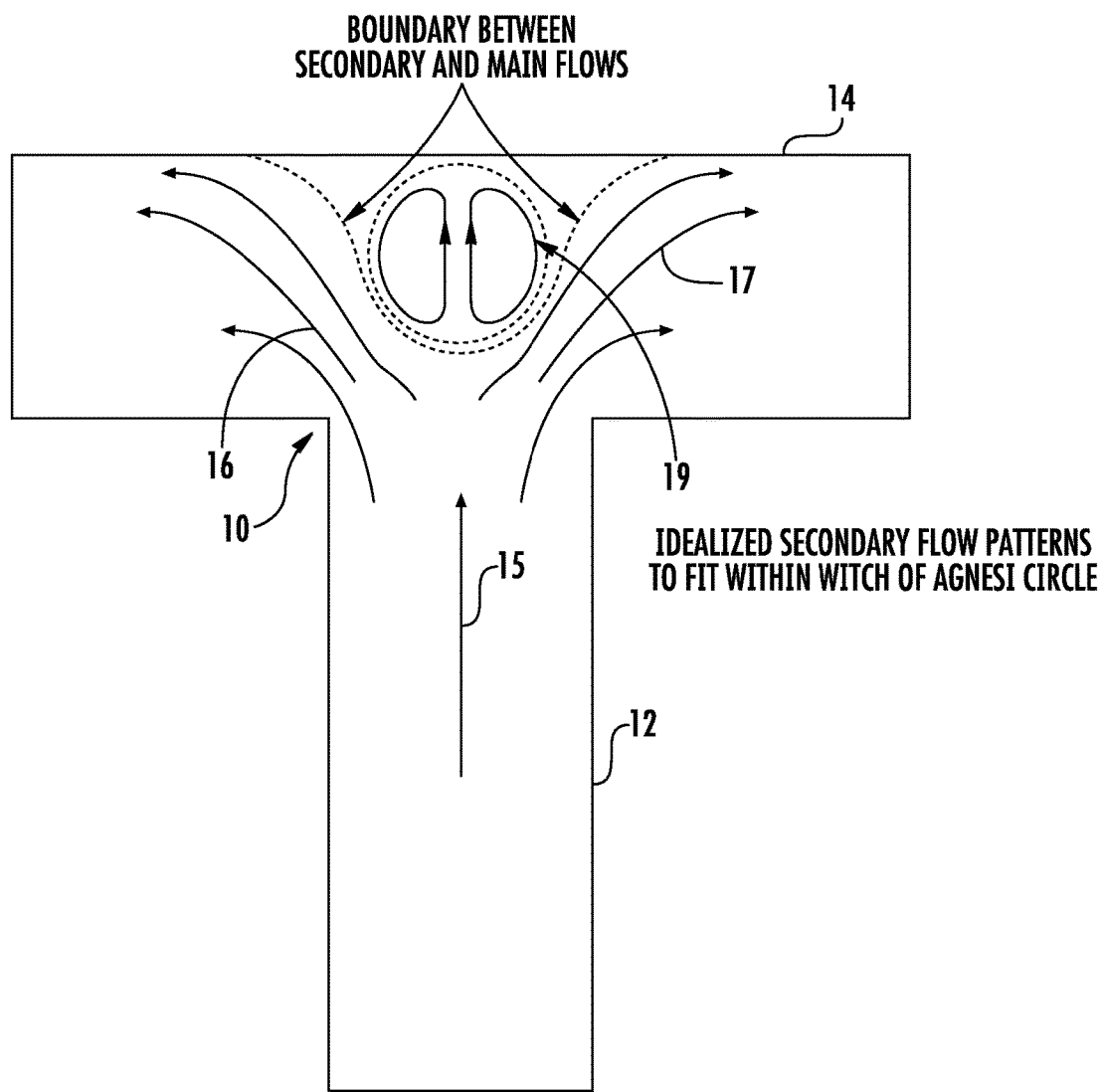
FIG. 1 is a schematic representation of a conventional T-junction at the rotor hub, illustrating flow separation.

Initial reference is made to FIG. 1 which is a schematic representation of flow separation in a conventional T-junction 10 between a hollow mast 12 and a rotor hub 14. An air stream, designated by arrowed line 15, flows vertically upward in hollow mast 12 into rotor hub 14. At this point, the air stream has to divide (in the simplest case) into two opposing streams 16 and 17, at right angles to mast 12. When air stream 15 divides in this manner, there is considerable flow separation in a volume 18 formed at the top of the mast and closed by rotor hub 14, with unsteady vortices that are driven by viscous interactions with the main flow. These interactions create significant pressure losses that, depending on the local velocity levels, can exceed 30%. These flow separation structures are made more complex due to the fact that the air, as it approaches the Tee junction (for a two bladed system), is effectively swirling. Hub 14 is rotating and the air flow 15 driven by friction will also rotate but at a lower speed. The relative speed between air flow 15 and hub 14 is the air speed equivalent to the speed over a static surface. The separated flow structure is shown as a paired vortex 19. Eliminating or greatly reducing these separated flow structures increases efficiency and reduces pressure losses.

Figure 2:
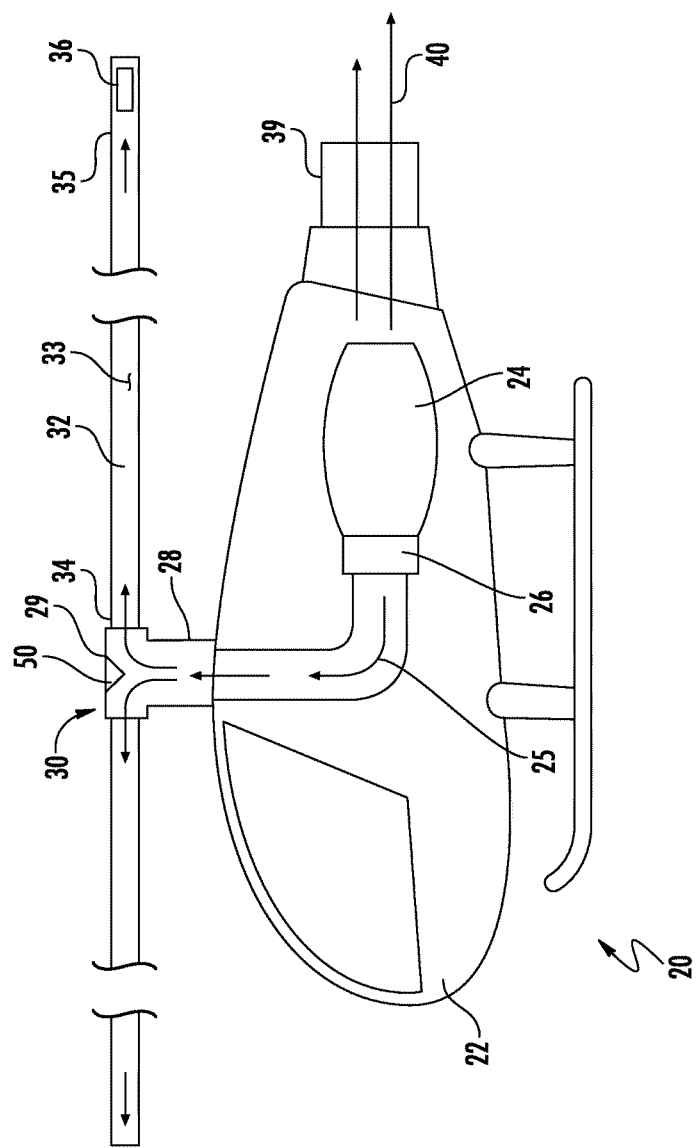
FIG. 2 is a representation of a reaction drive helicopter incorporating a deflector cone according to the present invention.
Figure 3:
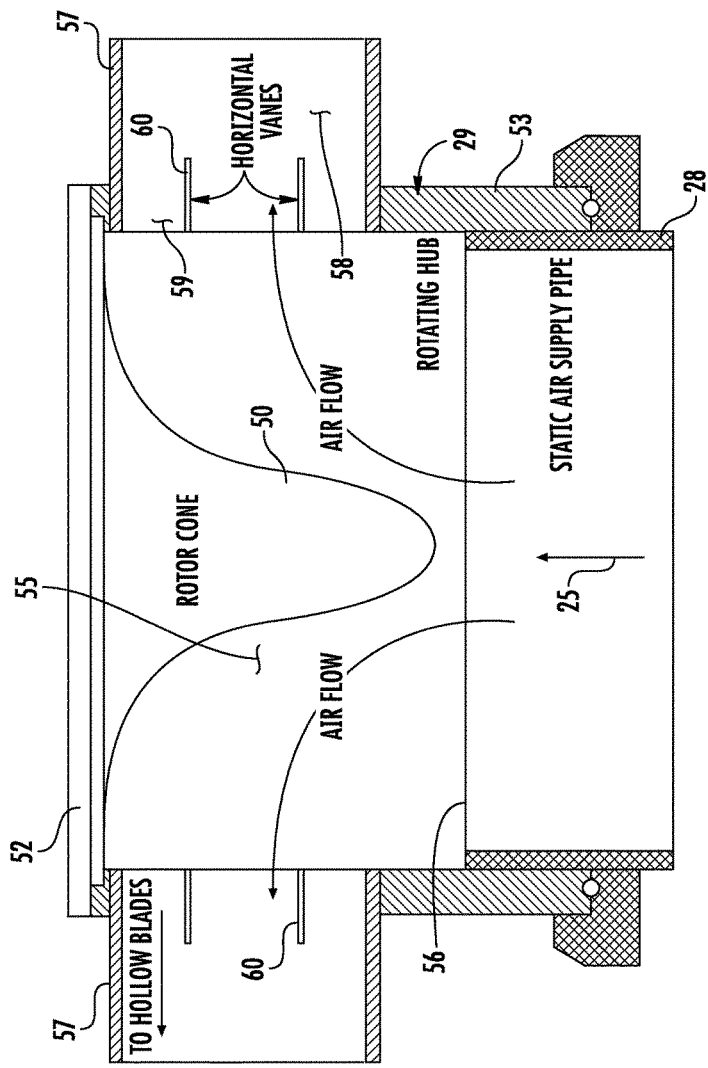
FIG. 3 is a sectional side view of a rotor hub with deflector cone and vanes, according to the present invention.

Turning now to the remaining drawings in which like reference characters indicate corresponding elements throughout the several views, attention is directed to FIG. 2 which illustrates a reaction drive helicopter, generally designated 20. Helicopter 20 includes a fuselage or body 22 carrying an engine 24 producing a stream of compressed air and/or gas 25. The air or gas flow path for reaction drive helicopters originates at either a driven load compressor 26 or a bleed from a gas turbine engine (not specifically shown). The air is ducted from engine 24 and/or compressor 26 to a hollow rotor mast 28 where it flows vertically upward to a hub 29 of a rotor 30. Hub 29 is rotatably coupled to mast 28 and has air channels that divide and transmit the air/gas to rotor blades 32 coupled to hub 29. Each blade 32 includes a proximal end 34 coupled to hub 29 and a distal end 35 terminating in a blade tip 36. Blades 32 are hollow and define a passage 33 extending from proximal end 34 to distal end 35 and are in communication with hollow rotor mast 28 through hub 29. The air/gas flow from mast 28 is turned through 90-degrees and split by hub 29. The air/gas is redirected and split between blades 32 where it is ducted through passages 33 to blade tips 36 and discharged. The discharged air/gas induces rotational movement of blades 32. Blade passages 33 that convey the air or gases to blade tip 36 are roughly elliptical in shape due to the required external blade profile. Directional control of helicopter 20 is effectuated by the movement of rudder 39, which is positioned in the flow of engine exhaust 40. By varying the position of rudder 39 within engine exhaust 40, helicopter 20 can be maneuvered by a pilot. Specific details of the reaction drive helicopter 20 and details of the production of the air/gases ducted to the blade tips have not been provided, since the blade tips, according to the present invention, will function with substantially any reaction drive helicopter discharging air/gas through the blades. How the air/gas is generated can be accomplished in a variety of methods.

Referring now to FIG. 2, secondary flow structures within hub 29 are eliminated or minimized in the preferred embodiment by the introduction of a three dimensional body referred to herein as a deflector cone 50. Rotor hub 29 attached to the top end of mast 28 and includes a top plate 52 and sidewall 53 defining an interior volume 55 accessed through an open bottom 56. Interior volume 55 is the space in which secondary flow structures are conventionally generated, as described with respect to FIG. 1. Sidewall 53 is cylindrical and is interrupted by a plurality of pipe section 57 defining passages 58 having an inlet 59. Blades 32 attached to hub 29 with passages 33 in communication with volume 55 through passages 58. In the simplest form, two opposing passages 58 correspond to two opposing rotor blades 32. However, it will be understood that more than two blades, with corresponding pipe sections 57 can be employed. Deflector cone 50 is carried within rotor hub 29 at the top of mast 28, depending downwardly from the center of top plate 52 (a vertical axis of rotation), to occupy volume 55 where the separated flow structures would normally form. These particular separated flows (as shown in FIG. 1) are part of a larger class of detached boundary layer flow structures that take the overall form of a Gaussian curve of revolution. The placement of deflector cone 50 eliminates the flow separation and guides the flow toward inlets 59 of pipe sections 57 that join hub 29 to blade passages 33 of blades 32.

Figure 6:
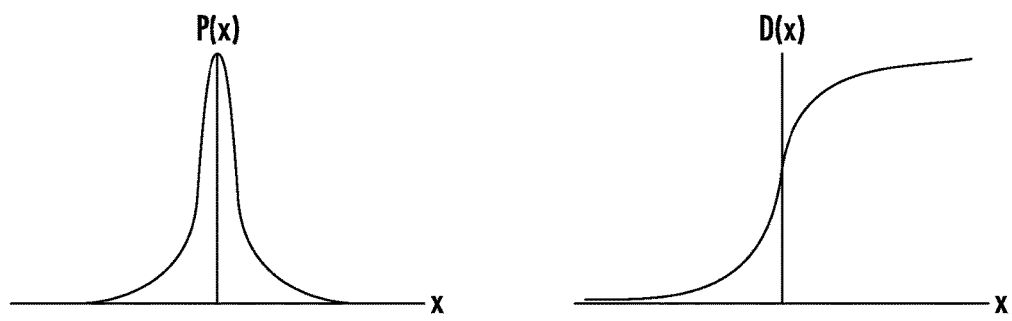
FIG. 6 shows graphs of Lorentzian/Cauchy distributions.

The shape of deflector cone 50 is generally conical. However, more specifically, the shape is based on "Witch of Agnesi" curves fitted to existing experimental data that delineated the shape of separated flow structure. Witch of Agnesi curve is defined as a plane cubic curve that is symmetric about the y-axis and approaches the x-axis as an asymptote and that has the equation $x^2y=4a^2(2a-y)$. The classical Cartesian equation for the Witch of Agnesi curves is given below as Equation 1. This equation also has been used in a more simplified form that produces similar results (see Equation 2). Equation 2 has been used mostly with the constant "a" equal to 3. The Witch of Agnesi curve is equivalent in functional form to the Lorentzian or Cauchy distributions which do provide a more accurate representation of the deflector cone contours (See FIG. 6). However, because of its simplicity it has been adopted here for estimating the deflector cone contours.

$$y=8a^3/(x^2+4a^2) \qquad \text{Equation 1}$$

$$y=a^3/(x^2+a^2) \qquad \text{Equation 2}$$

Where a is a constant usually between 1 and 4.

Any other conical shape will likely not occupy the secondary flow space completely and will allow some separation to occur. Deflector cone 50 has been found to reduce the pressure loss from a level in excess of 30% to less than 10%. As mentioned above the air is effectively swirling as it interacts with deflector cone 50 because the rotor head is rotating. Since there are no protruding structures that can create dynamic head losses the local pressure losses are minimized. Deflector cone 50 is not limited to use with two blades 32 as shown in FIG. 1, but is eminently suitable for use with any number of blades. In fact the greater the number of exit pipes 57 the more likely it is that the pressure losses will have greater reductions.

Figure 4:
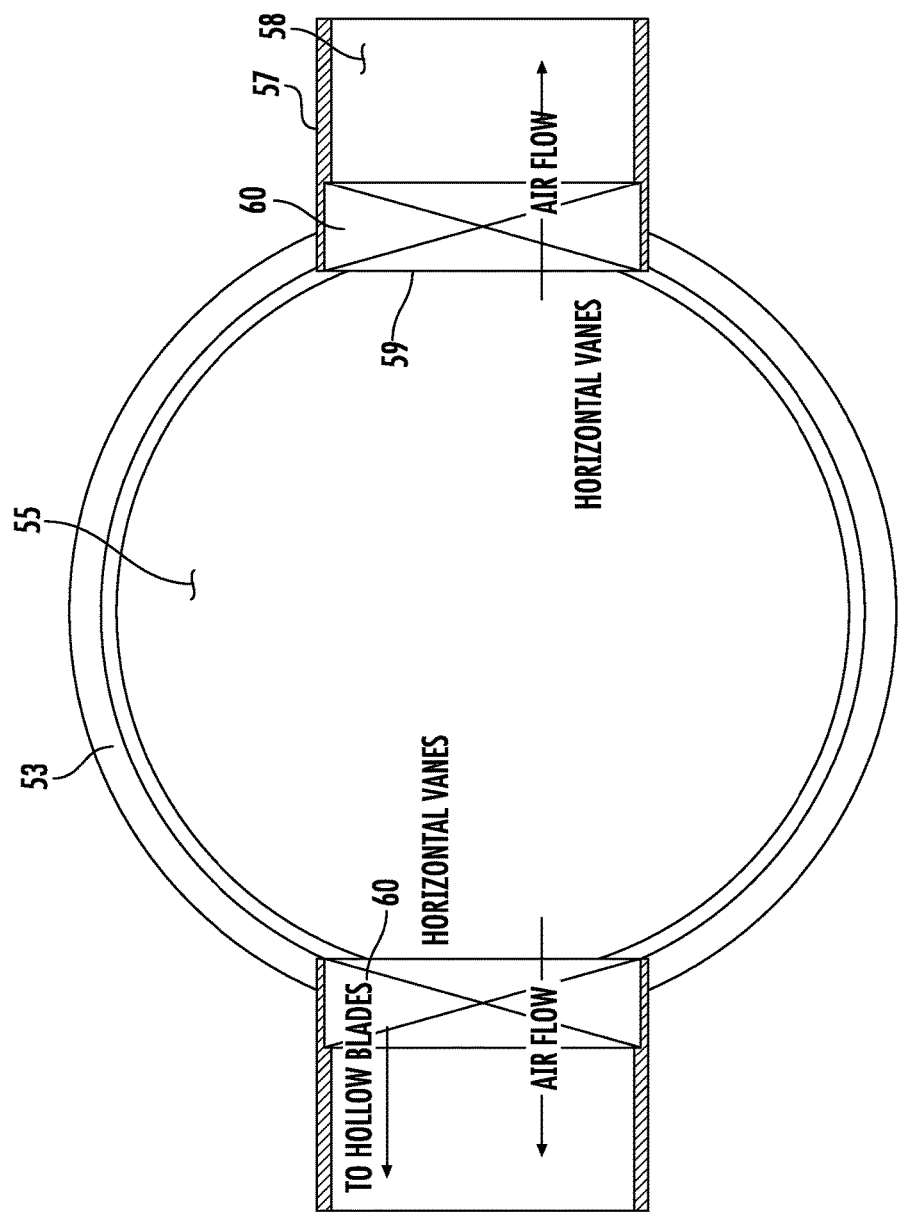
FIG. 4 is a top plan view of the rotor hub illustrating the positioning of the horizontal vanes.
Figure 5:
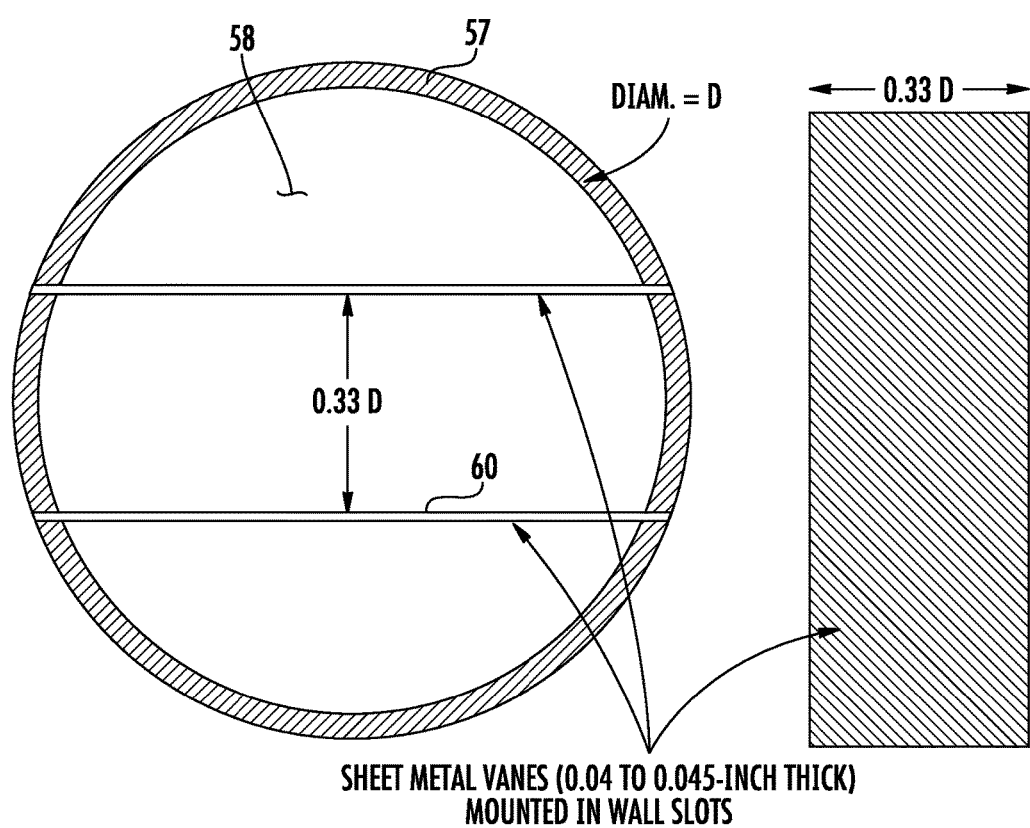
FIG. 5 is a sectional end view of a pipe section of the rotor hub, illustrating positioning of the horizontal vanes.

In addition to deflector cone 50 it is advantageous to position at least one vane 60 in each inlet 59 of pipe sections 57 as shown in FIGS. 4 and 5. The two horizontal vanes 60 shown have a minimal interaction with the main mast 28 "swirling" flow but function to eliminate the natural vortex creation at inlet 59 (bathtub flow) to pipe sections 57 defining passages 58, further eliminating pressure losses in this complex "Tee structure." Other vane configurations such as cruciform arrangements could be used but the vertical vane would interact with main swirling flow to cause additional pressure losses. Horizontally positioned vanes are preferred and will in general provide a low inlet pressure loss. Each vane 60 is as thin as structurally possible, and is preferably formed of sheet metal in the range of 0.04-0.045 of an inch thick. Vanes 60 are mounted within pipe sections 57 so as to essentially divide pipe sections 57 into thirds. Thus, the spacing between vanes 60 is approximately 0.33 of the diameter of pipe section 57.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A rotor hub for a reaction drive helicopter, the rotor hub comprising:
a cylindrical sidewall having a top and an open bottom, the cylindrical sidewall defining an interior volume;
a top plate closing the top of the cylindrical sidewall;
at least two pipe sections extending outwardly from the cylindrical sidewall, each pipe section extending through the sidewall and having an inlet in communication with the interior volume;
at least one vane carried in the inlet of each of the at least two pipe sections and extending across the inlet; and
a three dimensional body extending downwardly from a central axis of the top plate into the interior volume.

2. A rotor hub for a reaction drive helicopter as claimed in claim 1 wherein the three dimensional body has a shape determined by "Witch of Agnesi" curves.

3. A rotor hub for a reaction drive helicopter as claimed in claim 1 wherein the contours of the three dimensional body are determined from the equation $y=8\ a^3/(x^2+4a^2)$.

4. A rotor hub for a reaction drive helicopter as claimed in claim 1 wherein the contours of the three dimensional body are determined from the equation $y=a^3/(x^2+a^2)$.

5. A rotor hub for a reaction drive helicopter as claimed in claim 1 further comprising wherein the at least one vane extends horizontally across the inlet.

6. A rotor hub for a reaction drive helicopter as claimed in claim 1 wherein the at least one vane includes a pair of horizontal vanes carried in the inlet of each of the at least two pipe sections and extending horizontally across the inlet in a parallel spaced apart orientation.

7. A rotor hub for a reaction drive helicopter, the rotor hub comprising:
a cylindrical sidewall having a top and an open bottom, the cylindrical sidewall defining an interior volume;
a top plate closing the top of the cylindrical sidewall;
at least two pipe sections extending outwardly from the cylindrical sidewall, each pipe section extending through the sidewall and having an inlet in communication with the interior volume;
a horizontal vane carried in the inlet of each of the pipe sections and extending horizontally across the inlets thereof; and
a three dimensional body extending downwardly from a central axis of the top plate into the interior volume.

8. A rotor hub for a reaction drive helicopter as claimed in claim 7 wherein the three dimensional body has a shape determined by "Witch of Agnesi" curves.

9. A rotor hub for a reaction drive helicopter as claimed in claim 7 wherein the contours of the three dimensional body are determined from the equation $y=8\ a^3/(x^2+4a^2)$.

10. A rotor hub for a reaction drive helicopter as claimed in claim 7 wherein the contours of the three dimensional body are determined from the equation $y=a^3/(x^2+a^2)$.

11. A rotor hub for a reaction drive helicopter as claimed in claim 7 further comprising a second horizontal vane carried in the inlet of each of the at least two pipe sections, the second horizontal vane extending horizontally across the inlet in a parallel spaced apart orientation from the horizontal vane.

12. A rotor hub for a reaction drive helicopter as claimed in claim 11 wherein the horizontal vane and the second horizontal vane are spaced apart 0.33 times a diameter of the pipe section.

13. A reaction drive helicopter comprising:
a body;
an engine carried by the body for producing a stream of compressed gas;
a hollow rotor mast carried by the body for receiving the stream of gas, the mast terminating in a rotor hub;
wherein the rotor hub comprises:
 a cylindrical sidewall having a top and an open bottom rotatably coupled to the hollow rotor mast, the cylindrical sidewall defining an interior volume;
 a top plate closing the top of the cylindrical sidewall;
 at least two pipe sections extending outwardly from the cylindrical sidewall, each pipe section extending through the sidewall and having an inlet in communication with the interior volume;
 at least one vane carried in the inlet of each of the at least two pipe sections and extending across the inlet; and
 a three dimensional body extending downwardly from a central axis of the top plate into the interior volume; and
a plurality of blades, each blade of the plurality of blades having a proximal end coupled to one of the at least two pipe sections, a distal end, and a passage extending from the proximal end to the distal end terminating in a blade tip, the passage in fluid communication with the hub through the pipe section for ducting gasses from the mast to the blade tip.

14. A reaction drive helicopter as claimed in claim 13 wherein the three dimensional body has a shape determined by "Witch of Agnesi" curves.

15. A reaction drive helicopter as claimed in claim 13 wherein the contours of the three dimensional body are determined from the equation $y=8\ a^3/(x^2+4a^2)$.

16. A reaction drive helicopter as claimed in claim 13 wherein the contours of the three dimensional body are determined from the equation $y=a^3/(x^2+a^2)$.

17. A reaction drive helicopter as claimed in claim 13 wherein the at least one vane extends horizontally across the inlet.

18. A reaction drive helicopter as claimed in claim 13 wherein the at least one vane includes a pair of horizontal vanes carried in the inlet of each of the at least two pipe sections and extending horizontally across the inlet in a parallel spaced apart orientation.

* * * * *